(12) United States Patent
Ruhe et al.

(10) Patent No.: US 7,887,314 B2
(45) Date of Patent: Feb. 15, 2011

(54) COMESTIBLE PRODUCT SHEETER WITH REAR ACCESS

(75) Inventors: Scott D. Ruhe, Yorba Linda, CA (US); Peter A. Scherz, Orange, CA (US)

(73) Assignee: J.C. Ford Company, La Habra, CA (US)

( * ) Notice: Subject to any disclaimer, the term of this patent is extended or adjusted under 35 U.S.C. 154(b) by 1282 days.

(21) Appl. No.: 11/374,218

(22) Filed: Mar. 13, 2006

(65) Prior Publication Data
US 2006/0222749 A1 Oct. 5, 2006

Related U.S. Application Data

(60) Provisional application No. 60/661,051, filed on Mar. 11, 2005.

(51) Int. Cl.
*A21C 3/02* (2006.01)

(52) U.S. Cl. ............... 425/194; 425/196; 425/363; 425/367

(58) Field of Classification Search ............... 425/194, 425/196, 310, 363, 367
See application file for complete search history.

(56) References Cited

U.S. PATENT DOCUMENTS

| | | | | |
|---|---|---|---|---|
| 2,788,752 | A | * | 4/1957 | Rhodes ............ 425/363 |
| 2,898,873 | A | * | 8/1959 | Cale ............ 425/196 |
| 2,960,044 | A | * | 11/1960 | Anetsberger ............ 425/367 |
| 3,002,471 | A | * | 10/1961 | Jahn ............ 425/337 |
| 5,112,208 | A | * | 5/1992 | Voth ............ 425/367 |
| 5,124,163 | A | | 6/1992 | Hayashi |
| 5,180,593 | A | | 1/1993 | Mistretta et al. |
| 5,295,803 | A | | 3/1994 | Ogawa et al. |
| 5,470,599 | A | | 11/1995 | Ruhe |
| 5,498,148 | A | * | 3/1996 | Ouellette et al. ............ 425/363 |
| 5,720,990 | A | * | 2/1998 | Lawrence et al. ............ 425/363 |
| 5,811,137 | A | * | 9/1998 | Clark et al. ............ 425/194 |
| 6,530,771 | B1 | * | 3/2003 | Clark ............ 425/194 |

FOREIGN PATENT DOCUMENTS

GB 2171225 A 8/1986

OTHER PUBLICATIONS

Omron Corp., Omron Sysmac C200H Programmable Controller Brochure.
Omron Corp., Omron Type Z4W-V25R LED Displacement Sensor Instruction Manual, 1991.
Omron Corp., Omron Model C200H-NC112 Position Control Unit Instruction Sheet, 1990.

* cited by examiner

*Primary Examiner*—James Mackey
(74) *Attorney, Agent, or Firm*—Knobbe, Martens, Olson & Bear, LLP

(57) ABSTRACT

A comestible product sheeter is configured to provide enhanced access to the rollers and other components of the roller assembly. The one or more frame members of the roller assembly are configured to support the rollers at different vertical locations. Enhanced access is provided to both the rear and front rollers of the roller assembly by supporting one of the rollers in a cantilever configuration. The roller assembly may also be provided with a pivotally mounted cutting roller support arm to further improve access to the rollers and other components of the roller assembly.

17 Claims, 13 Drawing Sheets

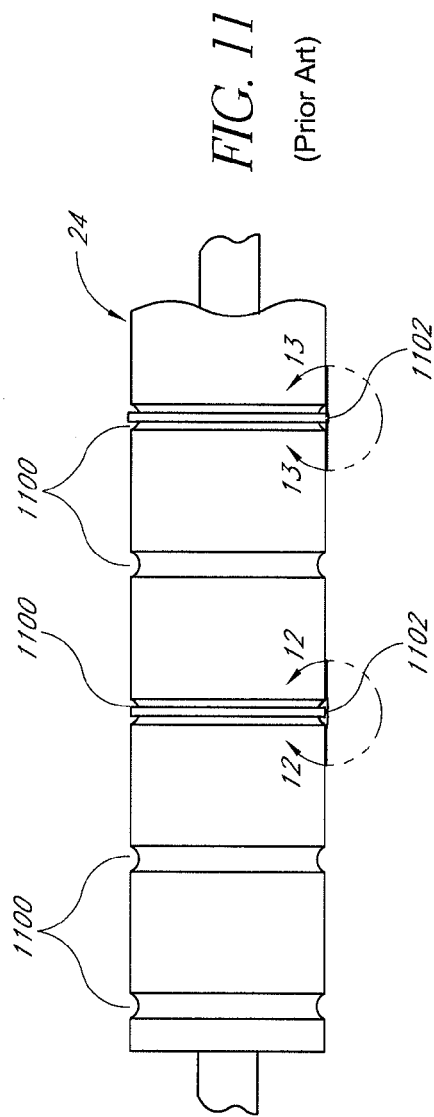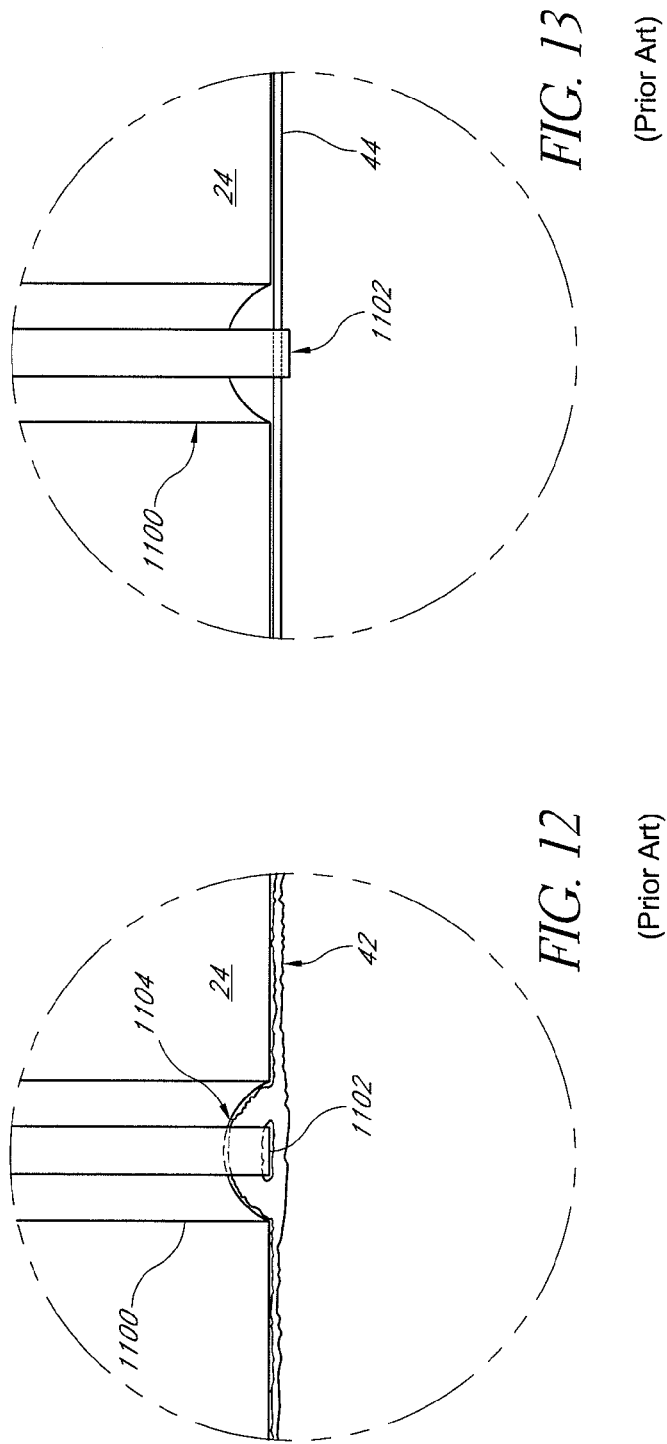
FIG. 11 (Prior Art)
FIG. 12 (Prior Art)
FIG. 13 (Prior Art)

COMESTIBLE PRODUCT SHEETER WITH REAR ACCESS

PRIORITY INFORMATION

The present application claims priority under 35 U.S.C. §120 to U.S. Provisional Patent Application No. 60/661,051, filed Mar. 11, 2005, the entire contents of which is hereby incorporated by reference.

BACKGROUND OF THE INVENTIONS

1. Field of the Inventions

The present inventions relate to high production sheeting devices for comestible products (e.g., tortillas and tortilla chips). More specifically, the inventions relate to a roller arrangement for a sheeting device which provides rear side access to components of the sheeting device which simplifies the maintenance and replacement of certain components, including, for example, but without limitation, cutting rollers, bands, and stripping wires.

2. Description of the Related Art

Corn tortillas and tortilla chips are cut from a sheet of corn dough, called "masa," and then baked and/or fried. In mass production, the sheeting and cutting stages are accomplished by a tortilla sheeter. Such sheeters usually have a pair of rollers that press masa into a sheet and a cutting roller that cuts the sheet into a shape near the desired final shape.

The rollers and other parts of these sheeters periodically wear out. Thus, the rollers, cutters, and other devices are periodically removed and replaced.

SUMMARY OF THE INVENTION

An aspect of at least one of the inventions disclosed herein includes the realization that substantial improvements in the ease and speed of certain maintenance procedures can be enhanced by providing better access to a rear side of the front roller of a sheeting device. For example, by improving access to a rear side of a front roller of a sheeting device, procedures for replacing and/or maintaining a cutting roller, a band, and/or a stripping wire can be greatly simplified and damage to other components of a sheeting system can be prevented.

Thus, in accordance with at least one of the embodiments disclosed herein, a comestible product sheeter can comprise a base portion and at least one frame member. The at least one frame member can comprise a first roller mounting section with at least a first open ended slot supporting a first roller to rotate about a first axis, and a second roller mounting section with at least a second open ended slot supporting a second roller to rotate about a second axis. The first and second rollers can be spaced from eachother sufficiently to press a comestible product into a sheet configuration. Additionally, the at least one frame can be configured to maintain the first axis at a higher vertical location than an outermost surface of the second roller.

In accordance with another embodiment, a comestible product sheeter can comprise a base portion and at least one frame member. The frame member can comprise a first roller mounting section configured to support at least a first roller, and a second roller mounting section configured to support at least a second roller. A first roller can be supported by the first roller mounting section and a second roller can be supported by the second roller mounting section in an orientation substantially parallel to the first roller and spaced from the first roller such that the first and second rollers can press a comestible product into a sheet configuration. The at least one frame can be configured such that a line extending between the axes of rotation of said first and second rollers is greater that approximately 15 degrees relative to horizontal.

In accordance with yet another embodiment, a comestible product sheeter can comprise a base portion and at least one frame member. The at least one frame member can include a first roller mounting section configured to support at least a first roller and a second roller mounting section configured to support at least a second roller. A first roller can be supported by the first roller mounting section and a second roller can be supported by the second roller mounting section generally parallel with the first rotating roller and spaced from the first roller such that a comestible product can be pressed by the first and second rollers into a sheet configuration. The at least one frame can be configured to support one of the first and second rotating rollers in a cantilever configuration or both of the first and second rollers in a single columnar arrangement.

In accordance with a further embodiment, a method of servicing a comestible product sheeter comprising a frame assembly supporting at least two rollers configured to rotate about first and second axes and to press a comestible product into a sheet configuration and a cutting roller configured to cooperate with at least one of the first and second rollers to cut the comestible product into smaller pieces can be provided. The method can comprise pivoting the cutting roller away from at least one of the first and second rollers and moving the cutting roller out of contact with and away from the sheeter along a direction transverse to the first and second axes of rotation.

BRIEF DESCRIPTION OF THE DRAWINGS

FIG. 11 is a schematic plan view of a front roller of a prior art sheeting device illustrating two bands disposed into grooves formed on the front roller;

FIG. 12 is an enlarged schematic plan view of the portion of the prior art front roller of FIG. 11, identified by the circle 12-12 and illustrating a comestible product entrained onto one of the bands; and FIG. 13 is an enlarged schematic top plan view identified by circle 13-13 of FIG. 11 illustrating a stripping wire disposed against an outer surface of the rear roller and extending beneath a band;

Figure 14:
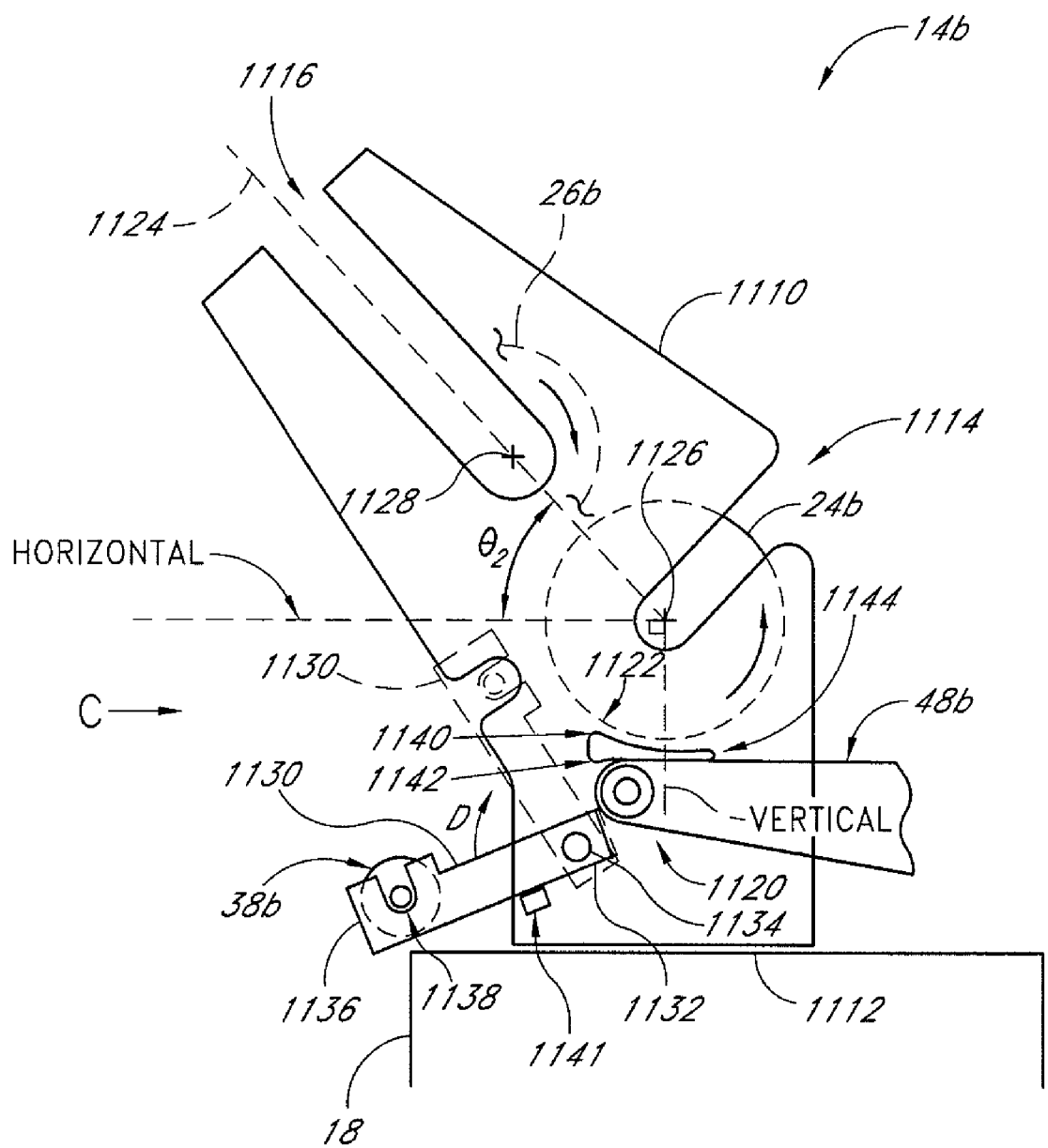
Figure 14A:
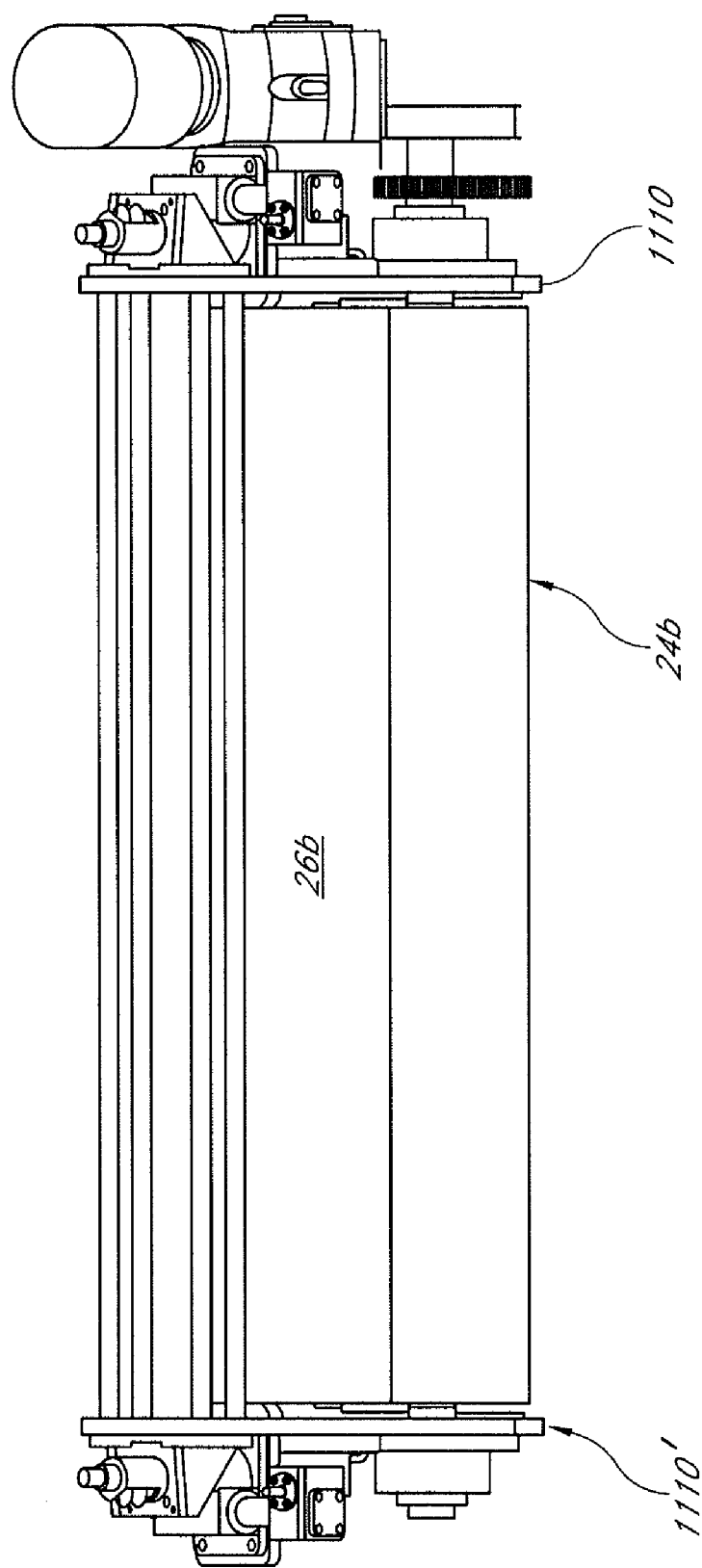

The features mentioned above in the Summary of the Inventions and other features of the inventions disclosed herein are described below with reference to the drawings of preferred embodiments. The illustrated embodiments are intended to illustrate, but not to limit the inventions. These additional drawings contain the following figures:

FIG. 14 is a side elevational view of a frame member of a roller component of a sheeting device constructed in accordance with an embodiment of at least one of the inventions disclosed herein, with some components of an associated sheeting device illustrated in phantom and with other components completely removed;

FIG. 14A is a front elevational view of the roller component of FIG. 14 with a cutting roller removed.

Figure 15:
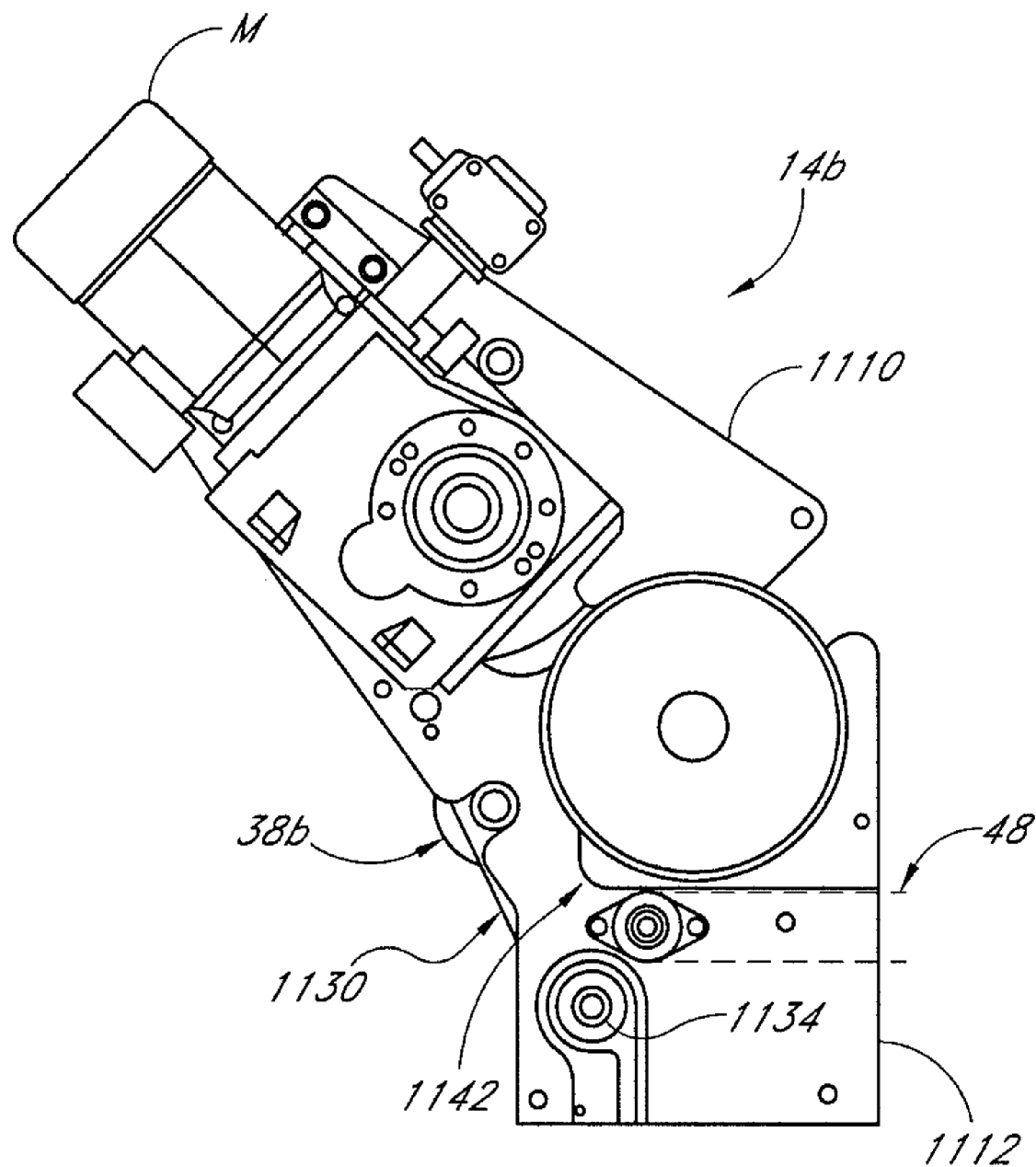
Figure 15A:
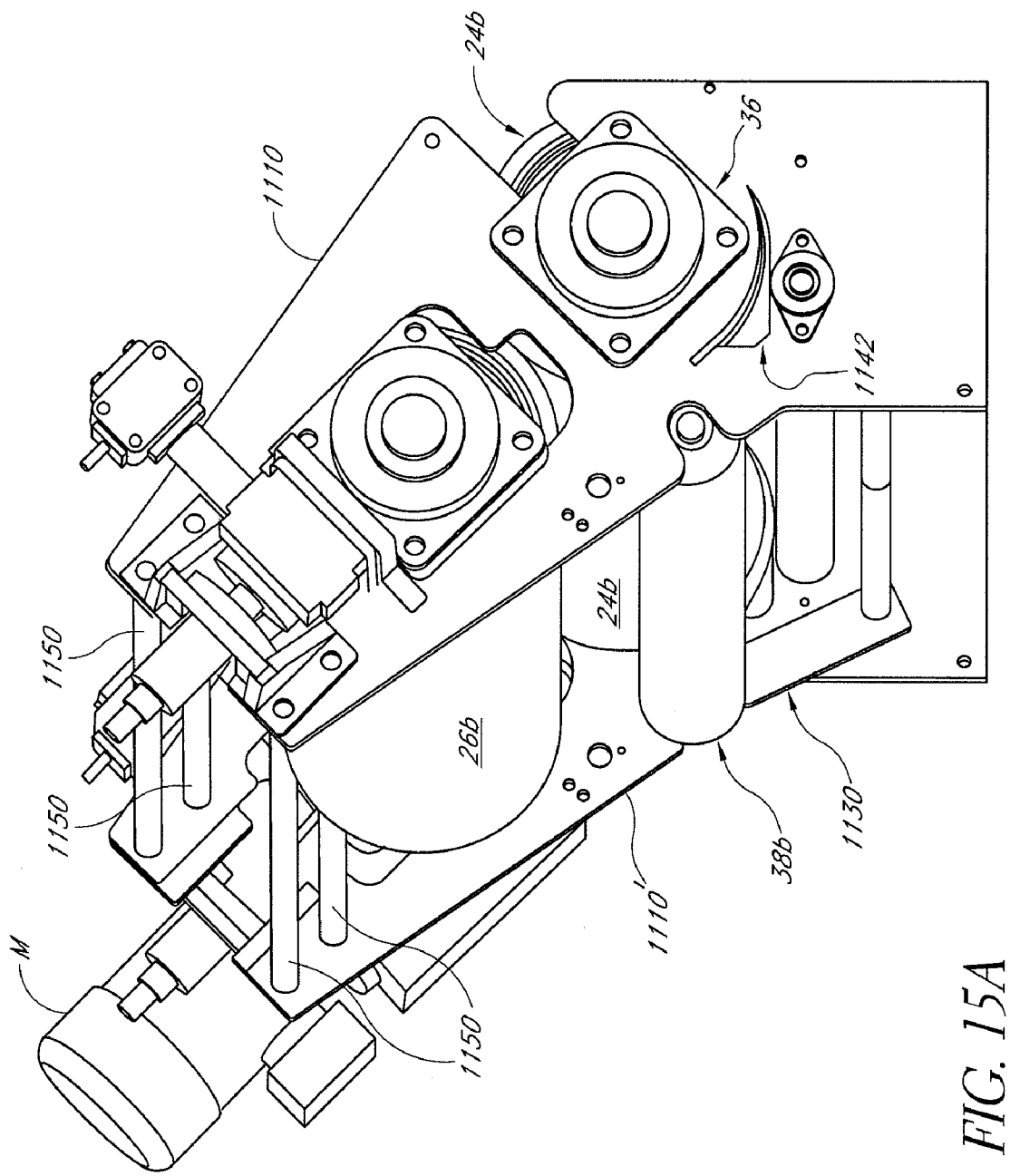

FIG. 15 is another side elevational view of a sheeting device including the frame member of FIG. 14; and FIG. 15A is a three-dimensional model (not to scale) of the roller component of FIG. 15 with a roller drive mechanism shown on the opposite side to that illustrated in FIG. 15.

DETAILED DESCRIPTION OF THE PREFERRED EMBODIMENTS

Figure 1:
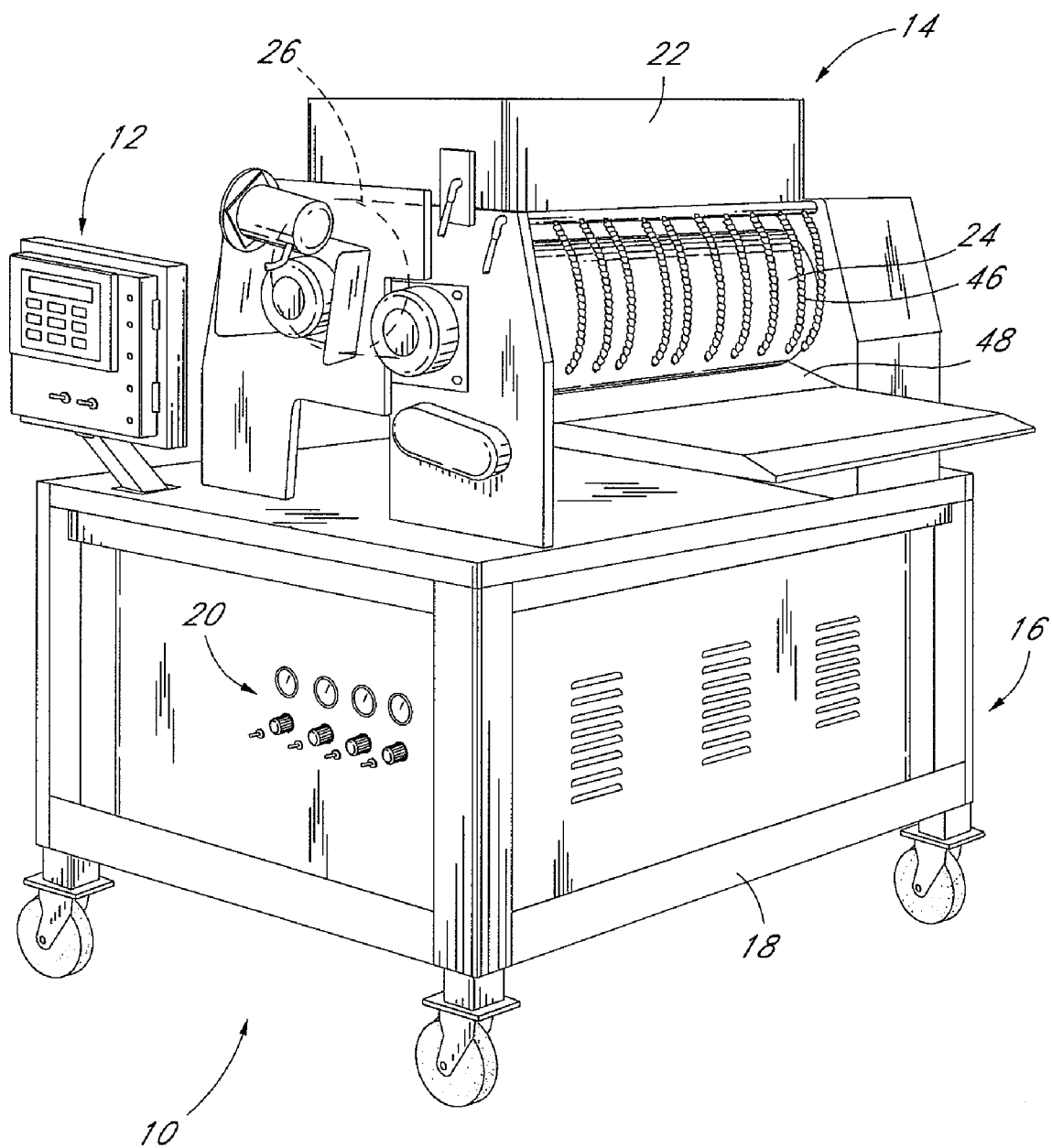
FIG. 1 is a perspective view of a prior art automated tortilla sheeter.

FIG. 1 illustrates a prior art tortilla sheeter 10 employing a thickness control system 12. Though the present inventions have equal applicability to a variety of different types of sheeters and other food rolling machines, FIG. 1 illustrates an exemplary prior art tortilla sheeter 10, the basic understanding of which assists in an appreciation of the present inventions.

With reference to FIG. 1, the sheeter 10 principally comprises a roller component 14 and a drive component 16. A lower housing 18 houses the drive component 16. The drive component 16 includes a conventional electrical motor (not shown) which drives the roller component 14 via a series of common gears and chains or belts (not shown), as known in the art. A conventional pneumatic control system 20 controls the pneumatic devices of the sheeter 10 (e.g., a stripping wire 44 and cutting roller 38).

The roller component 14 desirably rests on, or is attached to, the top of the lower housing 18 and includes a hopper 22 positioned above a pair of counter rotating rollers 24, 26. In the illustrated embodiment, the rollers are a generally cylindrical front roller 24 and a generally cylindrical rear roller 26. In one embodiment, the rollers 24, 26 have a slightly roughened surface (obtained, for example, with sandblasting). The rollers 24, 26 desirable rotate at the same revolution rate; however, it is understood that the rollers 24, 26 may rotate at different speeds if required by a specific application.

Figure 2:
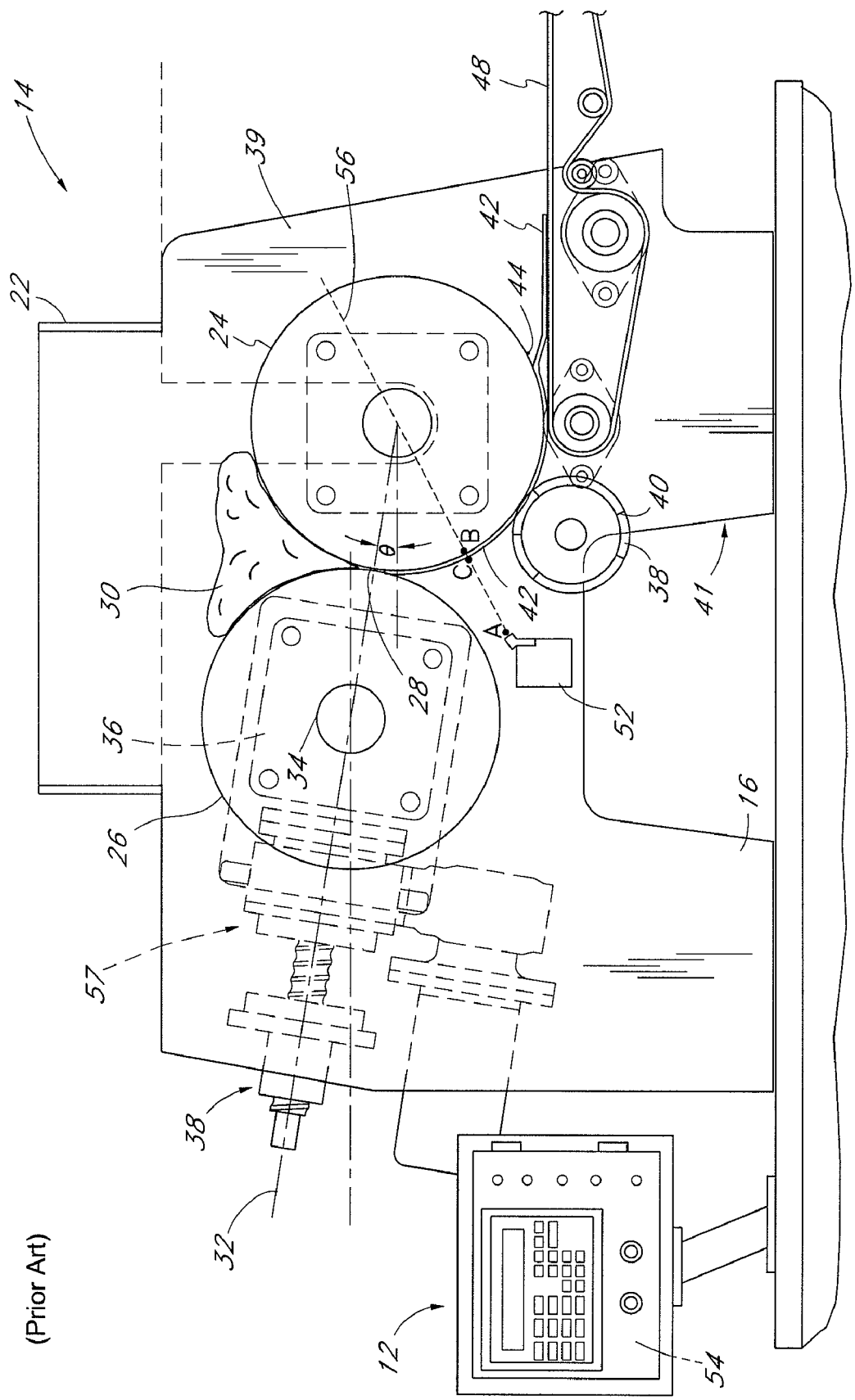
FIG. 2 is a side schematic view of a portion of a thickness control system and a roller component of the tortilla sheeter of FIG. 1.

The rollers 24, 26 are positioned parallel to each other and, as best seen in FIG. 2, define a pinch point 28, i.e., the point at which the rollers 24, 26 contact each other. In operation, as discussed below, the rollers 24, 26 are spaced slightly apart to form a gap between the surfaces of the rollers 24, 26 at the pinch point 28.

As FIG. 2 illustrates, the hopper 22 desirably is positioned above the rollers 24, 26 so as to contain masa (schematically represented and referenced by reference numeral 30) between the rollers 24, 26. As noted above, the term "masa" is used to denote a corn dough which is commonly used to form tortillas or tortilla chips. However, it is understood that the present sheeter 10 can be used with other types of comestible products, such as, for example, grain based doughs or like doughy food mixtures.

The rear roller 26 desirable moves relative to the front roller 24 to vary the spacing between the rollers 24, 26, i.e. to vary the spacing of the pinch point gap 28. For this purpose, the rear sheeting roller 26 is slidably mounted at its ends such that it may be moved relative to the front sheeting roller 24 along a sliding axis 32 (see FIG. 2). It should be understood, however, that in an alternative embodiment, the front roller 24 could move relative to the rear roller 26; or both rollers 24, 26 could move relative to each other in order to vary the spacing of the pinch point gap 28.

In the illustrated embodiment, the ends of the rear roller 26 can move independent of each other for variable adjustments across the length of the rear sheeting roller 26. That is, the gap spacing between the front and rear rollers 24, 26 may be greater at one end of the rollers 24, 26 than at the other end. This allows for the adjustment in gap spacing across the length of the rollers 24, 26 to account for fluctuations in consistency of the masa 30, as discussed below.

Figure 3:
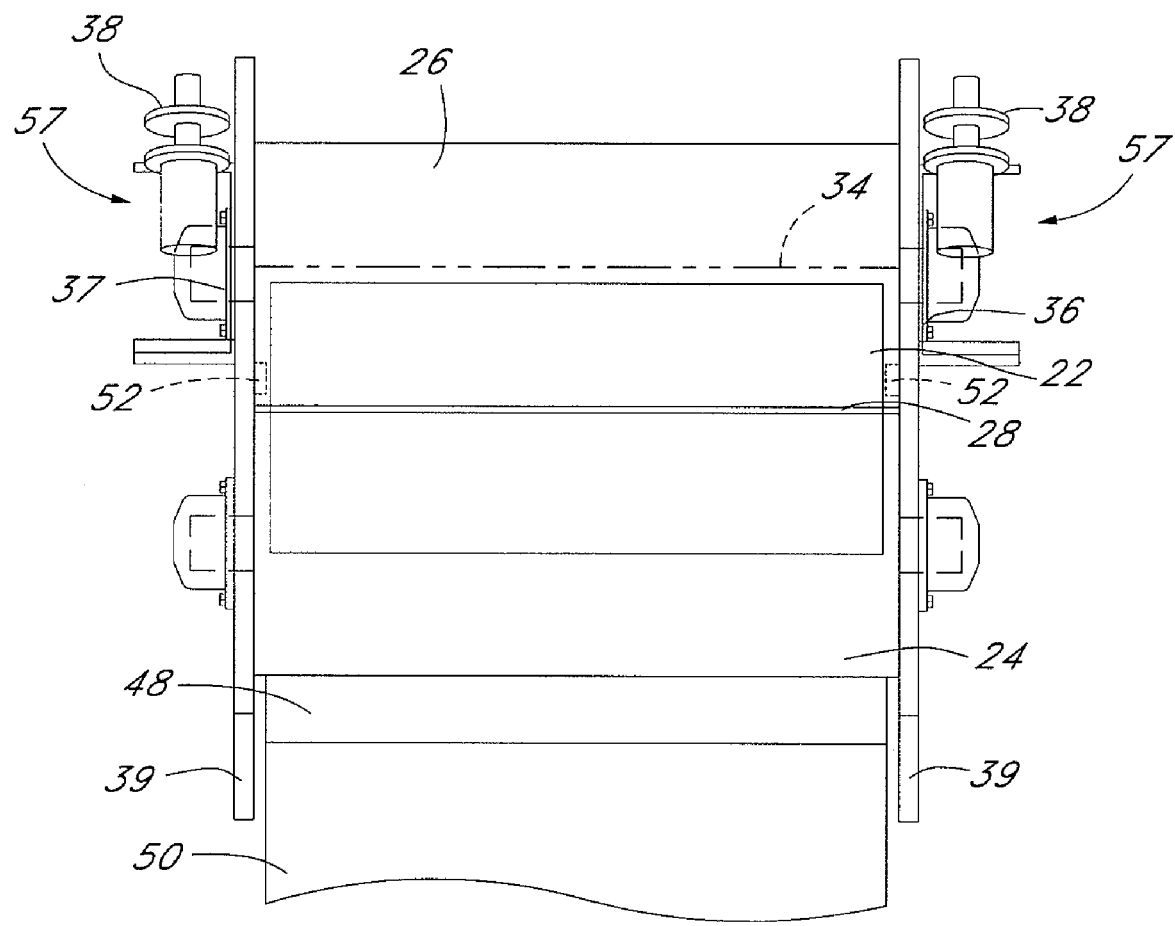
FIG. 3 is a partial top plan view of the tortilla sheeter of FIG. 1.

FIG. 2 illustrates one side of the roller component 14. As FIG. 2 shows, the rear roller 26 rotates about an axle 34. As illustrated in FIGS. 2 and 3, one movable bearing plate 36 supports one end of the axle 34 and an opposing bearing plate 37 (not shown in FIG. 2) supports the opposite end of the axle 34. Each bearing plate 36, 37 rides in a track (not shown) supported by a frame 39 of the roller component 14. A ball screw jack 38 is connected to each bearing plate 36, 37 to move the corresponding bearing plate 36 within the track.

The axis of the track, which defines the slide axis 32, is desirably positioned to pass through the longitudinal axes (i.e., the axes of rotation) of both the rollers 24, 26, and through the pinch point 28. Movement of the bearing plates 36 within the tracks thus moves the rear roller 26 relative to the front roller 24 to vary the gap size of the pinch point 28. That is, a linear change in displacement of the rear roller 26 along the slide axis 32 creates a substantially equal linear change in the spacing between the rollers 24, 26 at the pinch point 28. As seen in FIGS. 1 and 2, it also is advantageous to position the tracks such that the slide axis 32 is skewed relative to the horizontal by an angle θ, as well understood in the art. So positioned, the rear sheeting roller 26 sits above the front roller 24.

As illustrated in FIG. 2, the roller component 14 also includes a cutting roller 38 which bears against the front roller 24. The cutting roller 38 carries cutting dies 40 which are shaped to cut the masa sheet (schematically represented and referenced by reference numeral 42) into the desired product shapes, for example, into round tortillas or triangular tortilla chips, as known in the art.

As illustrated in FIGS. 1 and 2, conventional means, such as a stripping wire 44 (FIG. 2) and/or pneumatic blowers 46 (FIG. 1), strip the cut masa sheet 42 from the front roller 24. A conveyor belt 48 transports the formed masa product (e.g., the tortillas or tortilla chips), away from the rollers 24, 26 to a platform (not shown).

The above described components of the tortilla sheeter 10 are desirably made of any of a variety of hard, durable, water-resistant and stain-resistant material, and preferably are made of stainless steel, because food processing and handling requires a high degree of cleanliness.

The tortilla sheeter 10 as so far described is generally typical of prior construction. However, the automated thickness control system 12 is incorporated into the tortilla sheeter 10 to control the thickness of the product sheet 42 (e.g., the masa sheet) produced by the sheeting rollers 24, 26.

Figure 4:
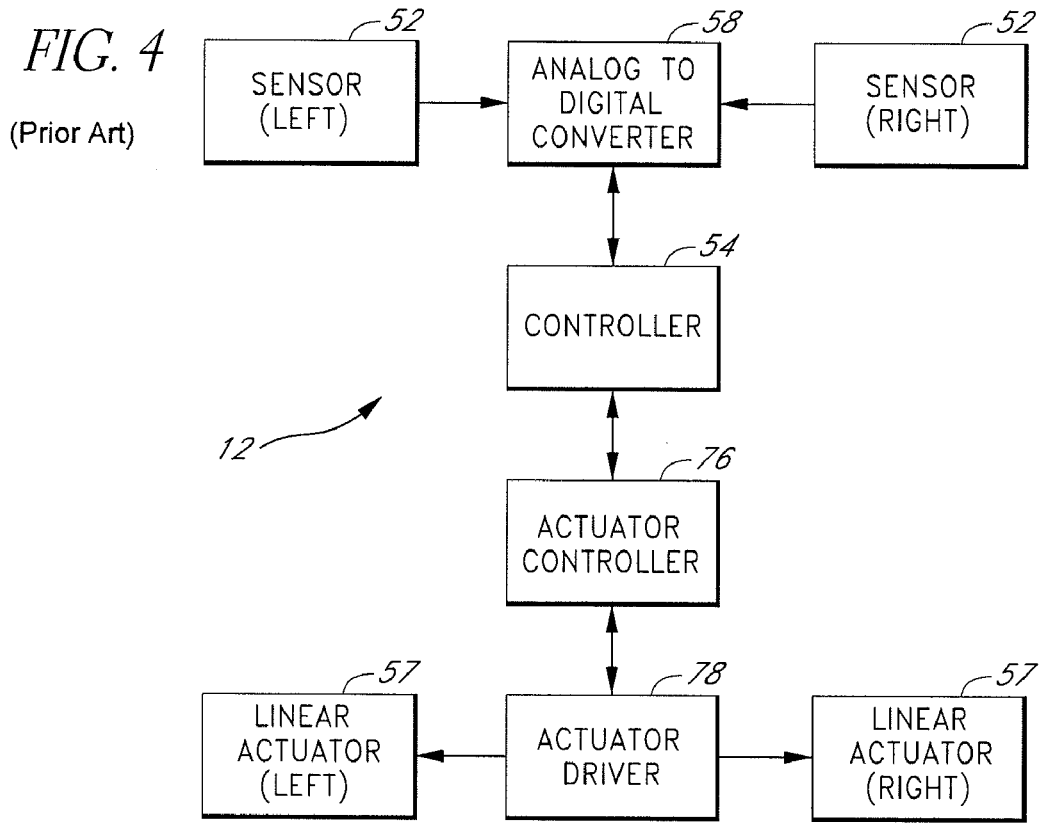
FIG. 4 is a block diagram of the thickness control system of FIG. 2.

As depicted in FIGS. 2 and 4, the thickness control system 12 includes at least one and preferably two thickness sensors 52 (one for the left end of the sheeting rollers and one for the right end of the sheeting rollers) connected to a controller 54. The controller 54 in turn connects to linear actuators 57 which move the rear sheeting roller 26, as described below.

FIG. 2 illustrates one of the thickness sensors 52. As seen from this figure, the thickness sensors 52 are mounted to detect the thickness of the exiting masa sheet 42. The sensors 52 desirably are positioned beneath and proximate to the pinch point 28 of the rollers 24, 26 so as to measure the thickness of the exiting masa sheet 42 before the cutting roller 38 acts upon the masa sheet 42. The sensors 52 also are arranged to measure the thickness of the masa sheet 42 along a detection axis 56 (FIG. 2) which passes through the axis of rotation of the front sheeting roller 24. This configuration ensures the measured displacement along the detection axis 56 is linearly proportional to the thickness of the masa sheet 42.

In the illustrated embodiment, the thickness sensors 52 comprise optical displacement sensors, such as the type commercially available as Omron Z4W-V25R LED from the Omron Corporation. Each optical displacement sensor 52 is arranged to measure the distance between its mounting point A and the surface B of the roller 24 or the outer surface C of the masa sheet 42 which covers the roller 24 during production. Each sensor 52 thus is arranged to measure the displacement of the surface C of the masa sheet 42 with respect to the surface B of the front sheeting roller 24, as explained below. Each optical displacement sensor 52 generates an analog signal which is linearly proportional to the displacement it detects. It is understood, however, that other types of sensors can be used which generate analog, digital or frequency outputs.

As mentioned above, the thickness control system 12 preferably includes two sensors 52. With reference to FIG. 3, one sensor 52 is mounted proximate to the left end of the front roller 24 and the other sensor 52 is mounted proximate to the right end of the front roller 24. In this manner, the thickness control system 12 monitors the masa sheet 42 at points proximate to both ends of the sheeting rollers 24, 26. It is appreciated, however, that the sensors 52 could be mounted at other locations along the length of the front roller 24, such as, for example, proximate to the center of the roller 24. It is also contemplated that the thickness control system 12 could employ more than two sensors 52 to monitor multiple locations along the length of the sheeting rollers 24, 26.

As depicted in FIG. 4, the thickness sensors 52 communicate with the controller 54. The thickness control system 12 may include a converter 58 to convert the signals from the sensors 52 into signals suitable for the controller 54 to analyze. In the illustrated embodiment, the converter 58 comprises a standard analog-to-digital converter, such as the Omron C200HAD001 4-channel analog input card. The analog signals generated by the optical displacement sensors 52 are provided as inputs to the analog-to-digital converter 58. The analog-to-digital converter 58 converts the analog signals from the left and right displacement sensors 52 into digital signals, which are then carried by signal lines to the controller 54 for analysis.

Figure 5:
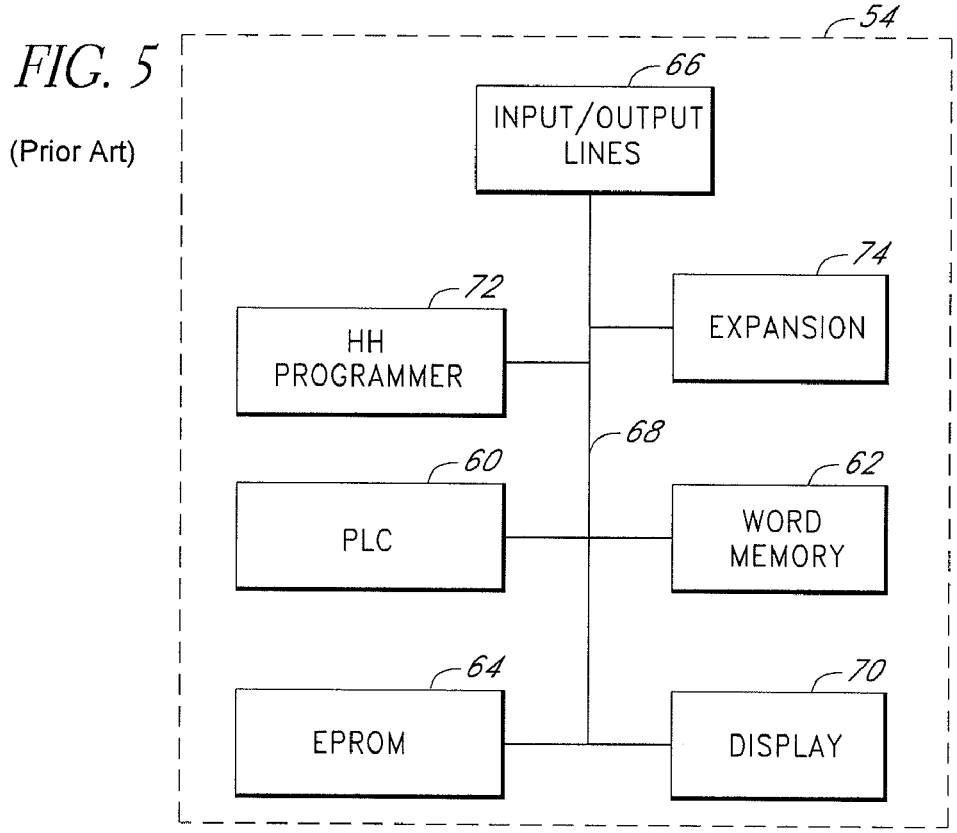
FIG. 5 is a block diagram which details the main functional elements of a controller of the thickness control system of FIG. 4.

FIG. 5 depicts the main functional elements of the controller 54. The controller 54 includes a programmable logic controller 60 (e.g., Omron C200HCPU01E programmable logic controller), a word memory 62 (e.g., Omron C200HMR8301 8K word memory module), an EPROM 64 (e.g., Omron C200HMP838 EPROM module), and input/output lines 66. These elements are interconnected by means of a backplane bus 68.

As used herein, the term "programmable logic controller" is intended to describe any programmable microcontroller capable of storing one or more instructions, and receiving one or more input signals and generating one or more output signals. In its preferred form, the term "programmable logic controller" refers to a class of programmable microcontroller devices for industrial use which allow logical manipulation of control signals to direct the operation of one or several devices, such as, for example, stepper or servo motors.

As illustrated in FIG. 5, the controller 54 can also include a display 70 (e.g., a Maple Systems Model No. 340A-OIT display module), a handheld programmable unit 72 (e.g., an Omron C200HPR027E handheld programmer), and an expansion unit 74 capable of accepting additional modules (e.g., an Omron C200HBC051B1 expansion rank), to provide additional monitoring and manual control of the controller 54. The backplane bus 68 of the controller 54 connects these elements to one another and to the programmable logic controller 60, the EPROM 64 and the word memory 62.

As depicted in FIG. 4, the controller 54 connects to an actuator controller 76. The actuator controller 76 interprets the output signal from the controller 54 and controls the distribution of power to the linear actuators 57. The actuator controller 76 is preferably a stepper control unit, such as the type commercially available from Omron as an Omron C200HNC112 2-channel stepper control card.

The actuator controller 76 in turn connects to an actuator driver 78 which selectively couples the linear actuators 57 to a power supply (now shown). The actuator driver 78 is preferably an American Precision P315 power supply and stepper motor driver.

In the illustrated embodiment, as best seen in FIG. 3, the thickness control system 12 desirably includes two linear actuators 57 connected to the ball jack screws 38 which are attached to the rear sheeting roller 26 as discussed above. Each linear actuator 57 independently drives the corresponding ball jack screw 38 on either the right or left end of the rear roller 26 to move the corresponding end of the rear roller 26 relative to the front roller 24 to increase or decrease the size of the gap at the pinch point 28. Both actuators 57 can also move simultaneously to uniformly increase or decrease the pinch point gap 28 across the length of the rollers 24, 26. It is contemplated that the structure of the left and the right linear actuators 57 will be substantially identical, and a description herein of one will be understood as applying equally to both, unless specified to the contrary.

Figure 6:
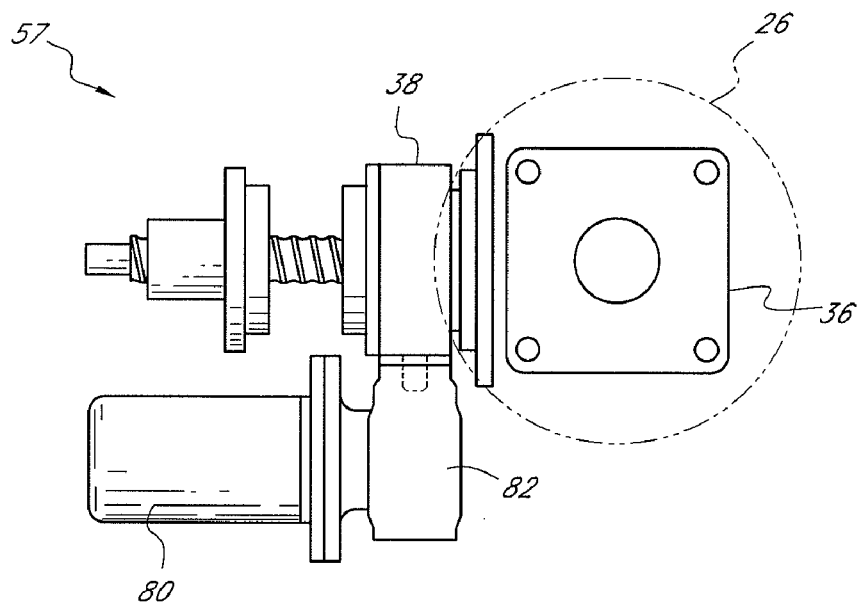
FIG. 6 is a side view of a linear actuator of the thickness control system of FIG. 2.

FIG. 6 depicts a preferred embodiment of the linear actuators 57. The linear actuators 57 desirably comprise a stepper motor 80 coupled through a right angle reducer 82 to the corresponding ball screw jack 38. The ball screw jack 38 connects to the corresponding bearing plate 36 as discussed above. In an exemplary embodiment, the stepper motor 80 is an American Precision M422 DC stepper motor, the right angle reducer 82 is a Nook 2420-12 right angle reducer with a 12:1 gear ratio, and the ball screw jack 38 is a Nook 5BSJ-UR five-ton ball screw jack with a 24:1 gear ratio. It should be understood that other stepper motors, right angle reducers, and ball screw jacks or other configurations for the linear actuator 57 which cause controllable displacement of the rear sheeting roller 26 are appropriate.

The combination of the stepper motor 88, the right angle reducer 82, and the ball screw jack 38 is preferably configured to produce incremental changes in the position of the rear sheeting roller 26 of approximately 0.001 inches. This degree of precision, however, is not necessary for tortilla production, and less accurate linear actuators also may be practical. It is contemplated that those skilled in the art can readily select appropriate actuator displacement characteristics to suit a specific application of the control system 12.

Figure 7:
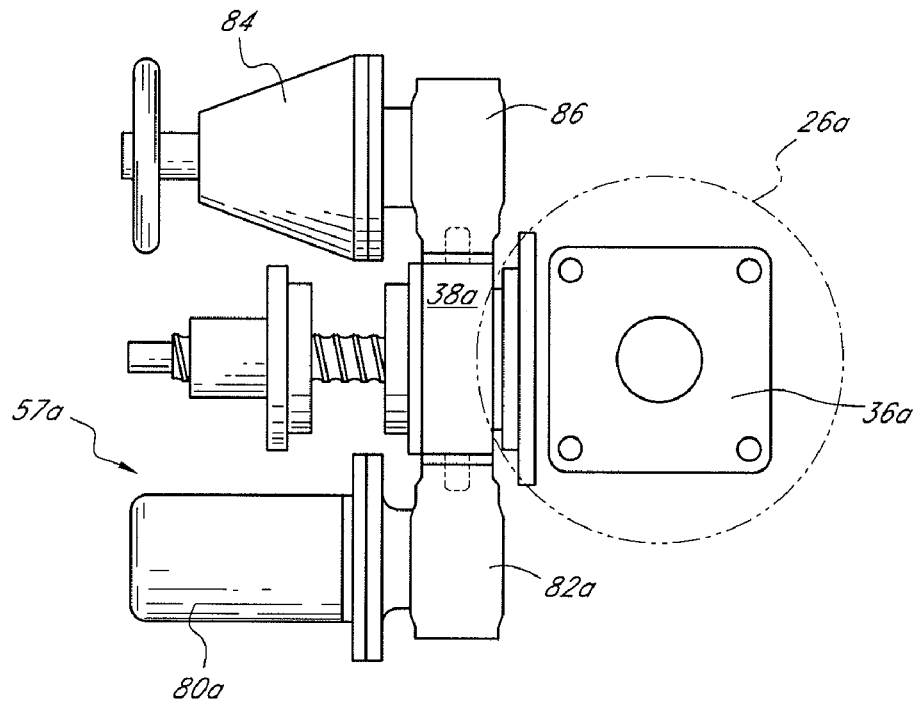
FIG. 7 is a side view of a prior art linear actuator.

FIG. 7 depicts an alternative version of a linear actuator 57*a*. The alternative linear actuator 57*a* is similar to that described above with the addition of a handwheel 84, and like reference numerals with an "a" suffix have been used to designate similar elements of the two embodiments. The handwheel 84 is coupled with a ball screw jack 38*a* through a second right angle reducer 86. This embodiment of the linear actuators 57*a* thus provides manual override adjustment capabilities. That is, an operator can manually open or close the pinch point gap 28*a* between the sheeting rollers 24, 26 using the handwheel 84.

Figure 8:
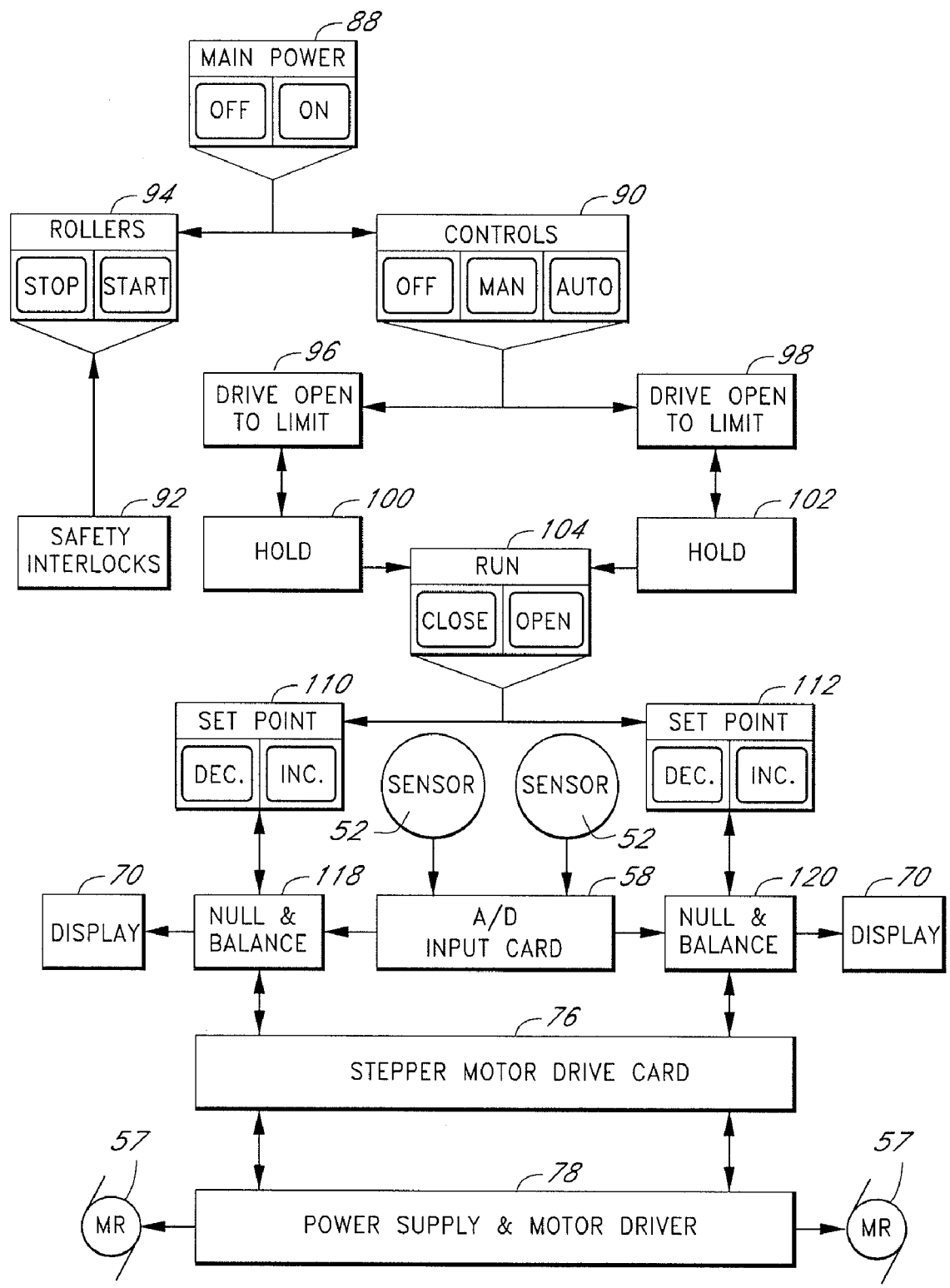
FIG. 8 is a hardware/software block diagram of the thickness control system of FIG. 2.
Figure 9:
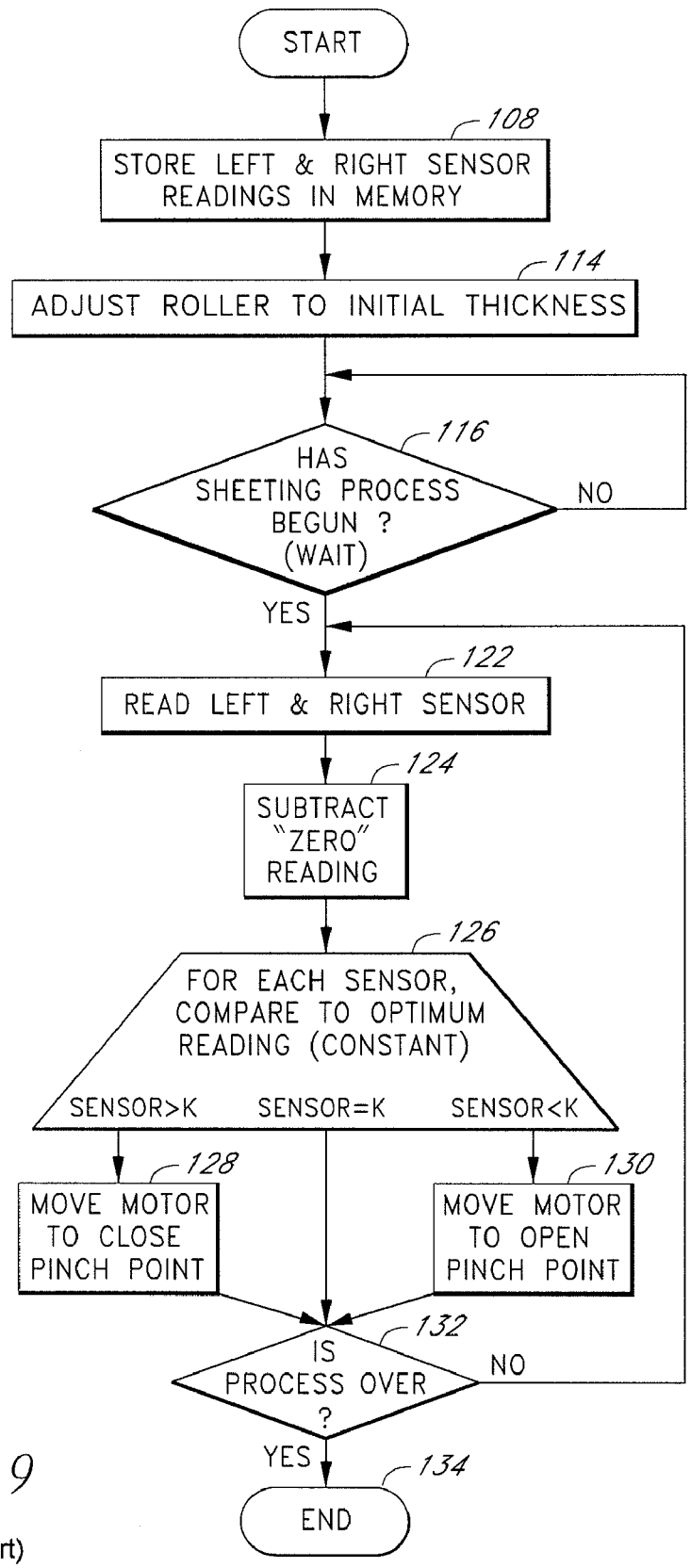
FIG. 9 is a generalized flowchart of a control program for the thickness control system of FIG. 4.

The operation of the thickness control system 12 is now described with primary reference to FIGS. 8 and 9. FIG. 8 depicts a hardware/software block diagram of the control system 12, and primarily represents the operation of the control system in an automated mode, as discussed below. FIG. 9 displays a representational flowchart of a control program to guide the operation of the programmable logic controller 60 of the controller 54. It should be understood that with the present embodiment of the programmable logic controller 60 (i.e., an Omron C200HCPU01E programmable logic controller), the control program is generally configured using ladder logic of the Omron Corporation. However, the flowchart of FIG. 9 depicts the general process flow for use with the programmable logic controller 60.

As seen in FIG. 8, the control system 12 includes an external main power switch 88 which controls the supply of three-phase power to the tortilla sheeting machine 10. Once an operator of the tortilla sheeter 10 activates the main power, the operator can then activate the operation of the rollers (i.e., cause rollers to rotate) via the start/stop switch 94. However, as represented in the operation block 92, the rollers will not start when the start switch is depressed unless all safety interlocks are in place (e.g., chain guards, etc. are closed and locked).

The control system 12 operates in either a manual mode or an automated mode, as selected by an external control switch 90. In the manual mode, the operator directly instructs the control system 12 via set point buttons to adjust the spacing between the sheeting rollers 24, 26 to a specified pinch point gap spacing. The control system 12 accordingly positions the rear sheeting roller 26 by actuating the linear actuators 57. The operator can also adjust (open and close) the gap spacing between the rollers 24, 26 via the same set point buttons.

In the manual mode, the control system 12 monitors the thickness of the produce sheet 42 (e.g., masa sheet), and displays the thickness on the display 70. However, the thickness is not used, in the manual mode, to cause automatic adjustment. The spacing of the gap 28 thus remains set at the preset amount, regardless of the consistency of the product mixture 30 and of the thickness of the product sheet 42. The operator enters new instructions using the set point buttons in order to change the gap spacing if the product sheet thickness is thicker or thinner than desired.

In the automated mode, as illustrated in FIG. 8, the control system 12 initially drives both actuators 57 open to their limit (see operation blocks 96, 98), and then holds the actuators 57 at the open position (see operation blocks 100, 102) until the operator activates the close operation with a "Run" switch 104.

When the close operation is activated, the control system 12 can begin active sheeting operation. Before the sheeting process begins, however, the controller 54 "zeroes" the left and right sensors 52 by reading the digitized sensor signals while the front sheeting roller 24 is "empty." That is, with reference to the illustrated embodiment of FIG. 2, the displacement sensors 52 measure the distance between their respective mounting points A and the surface B of the front roller 24 with no masa present. Each displacement sensor 52 then produces a signal indicative of the distance between the front roller 24 and the sensor 52. The converter 58 converts this signal into a signal suitable for interpretation by the controller 54 and sends the converted signal to the controller 54, as discussed above.

The control program, which is adapted for use with the programmable logic controller 60, then "zeroes" the readings from the sensors 57. In other words, the initial reading becomes the zero displacement reading. This operation is represented in the flowchart of FIG. 9, in a first activity block 108 where the control program stores the displacement readings from the left and right sensors 52 in word memory 62. The stored sensor readings establish an initial reference point from which the thickness of the product sheet 42 on the front roller 24 (FIG. 2) will be measured. For the purpose of discussion, these initially stored sensor readings will be referred to as the "zero displacement readings."

As depicted in FIG. 8, the operator uses the "Set Point" buttons 110, 112 to set a desired present thickness for each corresponding end of the sheeting rollers 24, 26 once the zero displacement readings are stored in memory 62. The control program, as represented in FIG. 9, then initially sets the rear sheeting roller 26, at operation block 114, to produce the desired product sheet thickness. Specifically, the control program activates the left and right linear actuators 57 via the stepper motor controller 76 (FIG. 4) and the actuator driver 78. The stepper motor controller 76 initiates displacement of the linear actuators 57 in an amount required to set the pinch point gap 28 at a spacing specific to produce the desired thickness of the product sheet 42 selected by the operator.

After adjusting the rear sheeting roller 26 to an initial gap spacing (i.e., to an initial thickness of the product sheet 42), the controller 54 determines whether the sheeting process has begun as represented in a decision block 116. If the sheeting process has not started, the control program remains idle (i.e., waits). Once the sheeting process begins, the control program proceeds to a null and balance routine, as represented in operation blocks 118, 120 of FIG. 8. The null and balance routine is discussed in detail below.

The sheeting process begins with the actuation of a switch (not shown) which begins the flow of masa. As depicted in FIG. 2, the masa 30 in the hopper 22 feeds into the pinch point gap 28 between the sheeting rollers 24, 26 once the sheeting process begins. The masa 30 continues to flow between the rollers 24, 26 during the sheeting process. The rotating sheeting rollers 24, 26 draw the masa 30 into the pinch point gap 28 where the rollers 24, 26 compress the masa 30 to form the masa sheet 42. The masa sheet 42 adheres to the front roller 24 after passing through the pinch point gap 28, as known in the art.

The displacement sensors 52 measure the distance between their respective mounting points A and the surface C of the masa sheet 42 which covers the front roller 24 during the sheeting process. In this manner, the sensors sense the displacement of the surface C of the masa sheet 42 with respect to the front roller surface B to the ascertain the thickness of the masa sheet 42, as discussed below. The signal generated by the sensors 52 during this stage of the operation is indicative of the distance between the sensors 52 and the surface C of the masa sheet 42. As represented in FIG. 8, the converter 58 converts the analog signal from the sensors 52 to a digital signal and sends it to the controller 54 which performs the null and balance routine, as represented in operation blocks 118, 120.

As represented in FIGS. 8 and 9, the controller 54, guided by the null and balance routine of the control program, analyzes the digital signals sent by the converter 58 to ascertain the thickness of the masa sheet 42 and to determine whether the spacing of the pinch point gap 28 should be increased or decreased in accordance with the desired preset thickness. Specifically, with reference to FIG. 9, the controller 54 reads the data input from the left and right displacement sensors 52, as represented in an activity block 122. The control program, at activity block 124, then recalls the zeroed displacement readings from word memory 62 (FIG. 5) and compares these values from the corresponding operational sensor readings. In the illustrated embodiment, the control program subtracts the stored zero displacement reading from the left sensor 52 from the operational reading from the left sensor 52. The control program also subtracts the stored zero displacement reading from the right sensor 52 from the operational reading from the right sensor 52. The difference between the zero displacement reading and the operational reading is indicative of the thickness of the masa sheet 42 at the corresponding sides of the rollers 24, 26.

As represented in a logic block 126 of FIG. 9, the control program compares the calculated thickness from the sensor readings with the desired preset thickness to determine whether the spacing of the pinch point gap 28 should be increased or decreased or should remain constant to obtain the desired preset thickness.

If the calculated thickness is thicker than the desired preset thickness, the control program proceed to activity block 128 and generates an output signal which instructs one or more of the linear actuators 57 to move the rear sheeting roller 26 closer to the front roller 24 to decrease the pinch point gap spacing. For this purpose, as represent in FIG. 8, the controller 54 communicates control output signals to the actuator controller 76 (e.g., the stepper motor drive card). The actuator controller 76 in response instructs the actuator driver 78 (e.g., the power supply and motor driver) to move one or more of the linear actuators 57 by an incremental amount to effect the decrease in the spacing of the pinch point gap 28.

In the illustrated embodiment, the control system 12 can independently adjust the spacing of the pinch point gap 28 on either end of the rear roller 26. That is, the controller 54 can instruct either actuator 57 independent of the other actuator 57.

It should be understood that very small changes in the thickness of the masa sheet 42 need not necessarily cause a change in the adjustment. Because of the characteristic of doughy matter, small differences can simply be created due to the texture of the material or air within the material. Accordingly, it is advantageous to select a threshold change which occurs over a selected period of time before a change is activated with the stepper motor 80. In other words, if the average thickness of the masa sheet 42 as detected as the left or right ends of the front sheeting roller 24 varies by at least a pre-selected threshold amount for a pre-selected threshold time period, the controller 54 then causes an adjustment to compensate for the thickness variation from the desired thickness.

With reference to the logic block 126 of FIG. 9, if the calculated thickness is thinner than the desired preset thickness, the control program generates an output signal which instructs one or more of the linear actuators 57 to move the rear sheeting roller 26 away from the front roller 24 to increase the spacing of the pinch point gap 28 as represented in an activity block 130. For this purpose, as represented in FIG. 8, the controller 54 communicates the appropriate control out put signal, which was determined by the null and balance routine (as represented by operation blocks 118, 120 of FIG. 8), to the actuator controller 76 (e.g., the stepper motor driver card). The actuator controller 76 instructs the actuator driver 78 (e.g., the power supply and motor driver) to move one or more of the linear actuators 57 by an incremental amount to effect the increase in the pinch point gap spacing.

The control program advances to decision block 132 after it instructs the linear actuators 57 to increase or decrease the pinch point gap spacing. As represented in FIG. 9, the control program also proceeds to decision block 132 if the operational masa sheet thickness is equal to the desired present thickness, or at least within the pre-selected threshold amount of the desired present thickness, as discussed above.

The control program, at decision block 132, determines whether the sheeting process is complete or continues. If the sheeting process continues, the control program returns to activity block 122 to sample additional readings of the sensors output signals. The control program then advances as described above to determine whether the pinch point gap spacing needs to be adjusted.

If the control program determines that the sheeting process is complete, the control program advances to the STOP block 134. The control program remains halted until restarted.

With reference to FIG. 8, the display 70 of the control system 12 continuously displays the operational thickness of the masa sheet 42 and the desired preset thickness. The display 70 desirably displays the present thicknesses and the calculated thicknesses at each end of the front sheeting roller 24. The display 70 also displays the operational mode of the control system 12 (e.g., manual or automated).

When the tortilla sheeter 10 runs in the automated mode with the desired present thickness input, the tortilla sheeter 10 produces a masa sheet 42 of substantially uniform thickness. Further human intervention is not required. Thus, the present control system 12 eliminates the need for human oversight and control during the production to improve product consistency and lower production costs.

Figure 10:
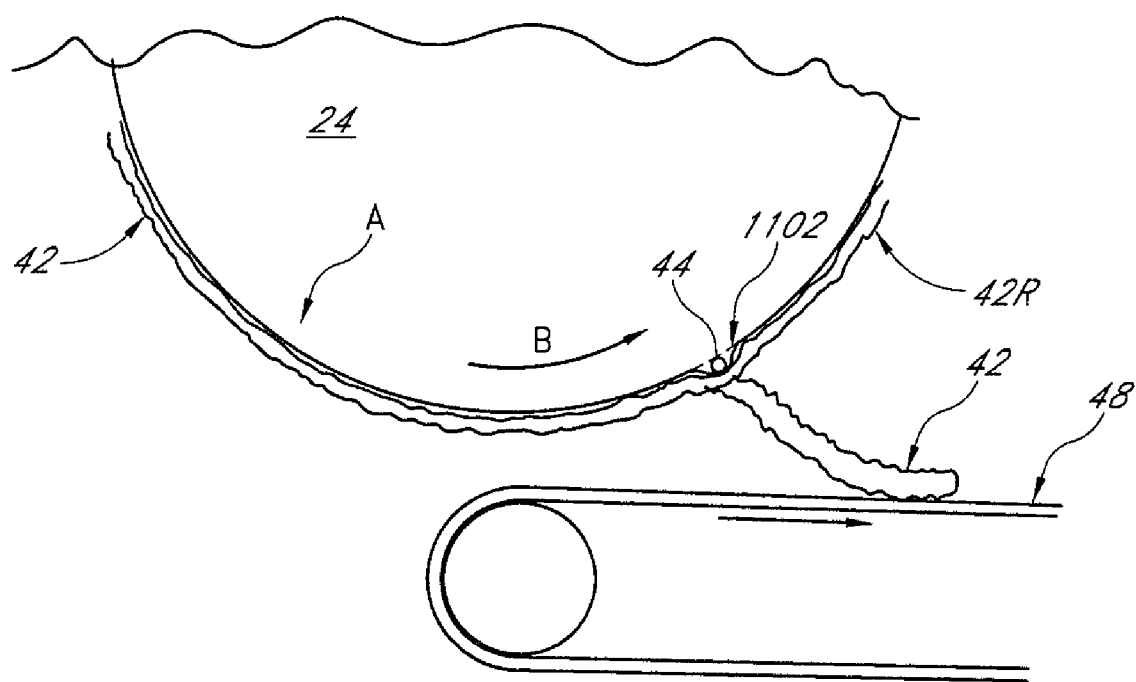
FIG. 10 is a schematic left-side elevational view of a comestible product being scraped off a front roller of a prior art sheeting device with a stripping wire so as to cause a tortilla to drop onto a conveyor belt while allowing the remaining comestible product to remain adhered to the front roller.

FIG. 10 illustrates an enlarged schematic side elevational view of a lower portion of the front roller 24 so as to provide a more detailed view of the point at which cut masa sheet 42 is removed from the front roller 24. In the illustrated example, the cut masa sheet 42 represents a raw corn tortilla. Such a raw tortilla is formed by the interaction of the cutting dies 40 of the cutting roller 38 and the masa 42 adhered to the outer surface of the front roller 24. Although not illustrated in FIG. 10, at a location corresponding to location A identified in FIG. 10, the masa sheet 42 is squeezed between the outer surface of the roller 24 and the dies 40 of the cutting roller 38 so as to form cut lines in the masa sheet 42.

Where it is desired to form tortillas, the dies include circular patterns for creating circular cut lines in the masa sheet 42. However, after leaving the cutting roller 38, the masa sheet 42 remains adhered to the outer surface of the front roller 24. As the masa sheet 42 rotates in the direction of arrow B with the outer surface of the front roller 24, the masa sheet 42 is separated from the outer surface of the front roller 24 by the stripping wire 44. Thus, in the illustrated embodiment, the portion of the masa sheet 42 dropping from the outer surface of the front roller 24 is in the form of a tortilla. The tortilla drops onto the conveyor 48 for further processing, for example, cooking and packaging.

The remainder of the masa sheet, identified generally by the reference numeral 42R, remains adhered to the outer surface of the front roller 24. One of the techniques used to retain the remainder masa sheet 42R against the outer surface of the front roller 24 is the use of bands 102.

FIG. 11 illustrates a schematic top plan view of the front roller 24. As shown in FIG. 11, the front roller 24 includes a plurality of grooves 1100 disposed in the outer surface of the front roller 24. The size of the grooves 1100 are illustrated in an exaggerated portion for clarity.

Within each of the grooves 1100, a band 1102 can be disposed. The band 1102 can be made from any material, including, for example, but without limitation, stainless steel, aluminum, plastics, etc. The band 1102 can have any width or thickness. A commonly used band can be made from 20-gauge stainless steel having the width between about one-eighth of an inch to less than about one-half of an inch. The length of the band 1102 is sized such that it nests within the groove 1100.

With reference to FIG. 12, during operation, when the masa sheet 42 is pressed against the front roller 24 by the rear roller 26 (not shown), the masa sheet 42 flows into the groove 1100 and around the band 1102. For example, as shown in FIG. 12, some of the masa sheet 42 flows into an area identified generally by the reference numeral 1104 disposed between the outer surface of the groove 1100 and an inner surface of the band 1102. As such, the masa sheet 42 becomes entrained with the groove 1100 and the band 1102.

The cutting dies 40 on the cutting roller 38 can be arranged so as to cut the desired resulting comestible product only in the area of the outer surface of the front roller 24 between the grooves 1100. Thus, with reference again to FIG. 10, as the final shape of the comestible product of the masa sheet 42 falls to the conveyor 48, the remainder 42R forms continuous strips along the grooves 1100 with discontinuous portions remaining in the areas between the grooves 1100.

With reference to FIG. 13, in order to help the remaining masa 42R to be dislodged from the outer surface of the roller 24, the stripping wire 44 is mounted so as to ride along the outer surface of the front roller 24 and beneath the bands 1102. As such, the bands 1102 help maintain the stripping wire 44 in close proximity or in contact with the outer surface of the front roller 24.

During operation, the remainder masa sheet 42R rotates along with the outer surface of the front roller 24 and back into the bulk masa identified by the reference numeral 30 in FIG. 2. In this area, which is generally disposed within the hopper 22, the remainder mesa sheet 42R is remixed and re-fed into the pinch point 28 and repeats.

During such operation, certain components of the sheeting device 10 continually wear-out. For example, a cutting roller 38 can wear out as frequently as every seven hours. For example, the surface, including the cutting dies 40, can become sufficiently worn that it can no longer reliably cut the desired shapes. Thus, typically, the entire roller 38 is removed every seven or eight hours or about once a day and replaced with a new cutting roller 38.

With reference to FIG. 2, a typical procedure for replacing a cutting roller 38 includes dismantling the support members that hold the cutting roller 38 against the front roller 24, lowering the cutting roller 38 into alignment with the arch identified generally by the reference numeral 104 in FIG. 2, and sliding the cutting roller 38 out.

Typically, the sheeting device 10, such as that illustrated in FIG. 2, is over 30 inches wide. Additionally, because the stresses applied to the rollers 24, 26, and the cutter 38 are quite high, these components are made from thick and heavy materials, such as stainless steel. Thus, the reinstallation of a cutting roller, such as the cutting roller 38, can be quite difficult. Additionally, during the process of inserting a new cutting roller into the arch 41 and reattaching it to the support mechanisms that hold the cutting roller 38 against the front roller 24, the cutting roller 38 can be damaged.

Further, because of the confined space and limited access to the area around the cutting roller 38, two or more people are preferable for replacing a cutting roller. The slightest damage to a new cutting roller can greatly shorten the useful life of the roller. Thus, the procedure for replacing the cutting roller in the sheeting device 10 illustrated in FIG. 2 can be time-consuming.

Stripping wires and bands such as the stripping wire 44 and the band 1102 also fail quite frequently during operation of a sheeting device. For example, the bands 1102 and/or the stripping wire 1104 can break as frequently as every three to four hours during operation of a sheeting device.

With reference to FIG. 2, when a stripping wire 44 or a band 1102 breaks, it is usually necessary for a worker to sit or stand on the conveyor 48 in order to have sufficient access to the bands 1102 for a replacement procedure. For example, when a band 1102 breaks, firstly, the sheeting device 10 must be stopped. Additionally, it is often useful to move the front and rear rollers 24, 26 apart, as well as moving the cutting roller 38 away from the front roller 24. Then, the worker can wrap a new band 1102 around the corresponding groove 1100 so as to enclose the band 1102 around the groove and the stripping wire 44.

Usually, the conveyor 48 is the only location where a worker can achieve sufficient access to perform such a procedure. However, not only is standing or sitting on the conveyor 48 a difficult position to perform such an operation, it also damages the conveyor 48. As is widely known in the art, lubricants are not allowed to be used on surfaces that contact food. Thus, the conveyors 48 that are used are highly susceptible to damage.

Similarly, when the stripping wire 44 breaks, a worker must stand or sit on the conveyor 48 and rethread a new stripping wire 44 from one side of the sheeting device 10 to the other. For example, with reference to FIG. 11, a worker or mechanic must thread a new stripping wire 44 beneath each band 1102 that is disposed within each groove 1100 until the stripping wire 44 reaches the other side of the sheeting device 10.

Often times, a worker will use a screw driver or a knife to pry-up the band 1102 to provide sufficient clearance for threading the stripping wire 44 therethrough. This procedure can often damage a band 1102 and/or a rolling surface of the front roller 24. As such, the useful life of the bands 1102 and the front roller 24 can also be reduced during this procedure. This procedure also damages the conveyor 48 in the same manner noted above with respect to the replacement of a band 1102.

FIGS. 14-15A illustrate a nonlimiting embodiment. This embodiment is generally directed to a roller component 14b. The roller component 14b has some similarities to the roller component illustrated in FIGS. 1-3. Like reference numerals with a "b" suffix have been used to designate elements of the roller component 14b that are similar or identical to the corresponding components of the roller component 14. Thus, those components identified with like reference numerals can be the same or similar to the corresponding components of the roller component 14 described above, except as expressly noted below.

With reference to FIG. 14, a frame member 1110 includes a base portion 1112 configured to support the roller component 14b on the floor or on top of a lower housing such as the lower housing 18 illustrated in FIG. 1. The base portion 1112 supports a front roller mounting section 1114 and a rear roller mounting section 1116. Additionally, the base portion 1112 can support a cutting roller support section 1118, a conveyor support section 1120, and a stripping wire support portion 1122. Additionally, the base portion 1112 can support other components.

The support sections 1114, 1116 are in the form of slots. However, this is merely one exemplary configuration for supporting the front and rear rollers 24b, 26b. In this embodiment, the slots of the support sections 1114, 1116 are configured to receive shafts of the front and rear rollers 24b, 26b. Additionally, the material surrounding the slots are configured to provide sufficient support for bearing plates such as the bearing plates 36 illustrated in FIG. 2 for supporting the front and rear rollers 24b, 26b. Other configurations can also be used. In an exemplary but nonlimiting embodiment, the frame member 1110 can be formed from one inch thick stainless steel plate. However, this is merely one nonlimiting embodiment of the frame member 1110; other materials and thicknesses can also be used.

A further advantage is achieved where the support sections 1114, 1116, are configured to allow the front and rear rollers 24b, 26b to be arranged such that a line 1124 extending between axes of rotation 1126, 1128 of the front and rear rollers 24b, 26b extends at an angle $\theta_2$ relative to horizontal, that is greater than about 15 degrees. In some embodiments, the angle $\theta_2$ can be in the range of about 15 degrees to about 90 degrees. In some embodiments, the angle $\theta_2$ can be in the range of about 30 to 60 degrees. In some embodiments, the angle $\theta_2$ can be about 45 degrees.

With the line 1124 extending at any one of the above-mentioned angles θ2, a worker or mechanic is provided with enhanced access to the rear side of the front roller 24b. For example, with continued reference to FIG. 14, the arrow C shown in FIG. 14, illustrates a direction from which a worker or mechanic can access the cutting roller 38b. As used herein, the rear side of the front roller 24b is intended to mean the side of the front roller 24b that faces toward the cutting roller 38b.

As illustrated in FIG. 14, this configuration of the rollers 24b, 26b makes it easier for a worker or a mechanic to service the rear roller 24b. For example, the enhanced access to the rear side of the rear roller 26b facilitates the removal and the subsequent replacement of the rear roller 26b. This is especially true for the embodiment shown in FIG. 14, where the support section 1116 for the rear roller 26b is slotted. Preferably, the slot in the support section 1116 is open towards the rear of the roller component 14b. Likewise, the support section 1114 for the front roller 24b may also be advantageously slotted to facilitate the servicing of the front roller 24b.

Thus, the rollers 24b, 26b can be more directly removed from and positioned into the roller assembly 14b. Consequently, this improved and more direct access to the rollers 24a, 24b and other portions of the roller component 14b helps reduce the number of workers and the overall time required to service a comestible product sheeter. Further, the risk of damaging the rollers 24a, 24b and the adjacent components (e.g., the cutting roller assembly, conveyor assembly, etc.) is reduced.

In some embodiments, as illustrated in FIG. 14, the cutting roller support section 1118 can include a cutting roller support arm 1130 having a first end 1132 that is pivotally mounted to the frame member 1110. In the illustrated embodiment, the frame member 1110 supports a pivot shaft 1134 which pivotally supports the pivot arm 1130.

A second end 1136 of the pivot arm 1130 can include a slot or recess 1138 configured to receive an end or an end shaft of the cutting roller 38b. A bearing (not shown) can also be mounted to the pivot arm 1130 for rotatably supporting the cutting roller 38b.

Optionally, the frame member 1110 can also include a stopper 1141 for limiting the movement of the pivot arm 1130. As such, with the pivot arm 1130 in the position illustrated in solid line in FIG. 14, a worker can place a new cutting roller 38b into the slot 1138. The stopper 1141 can hold the pivot arm 1130 in the illustrated position. Afterwards, the worker or mechanic can pivot the pivot arm 1130 in the direction of arrow D to the position of the pivot arm 1130 illustrated in phantom line. In the phantom line position, the cutting roller 38b can be brought into operational contact with the front roller 24b.

It is to be noted that another frame member similar to the frame member 1110 can be provided on the opposite ends of the front and rear rollers 24b, 26b so as to provide a generally symmetric support for the rollers 24b, 26b, 38b and other components. FIG. 14a illustrates an elevational view of the roller component 14b taken from the direction of arrow C. The frame member identified generally by the reference numeral 1110' can be constructed so as to have the same or similar shape to the frame member 1110 illustrated in FIG. 14. Thus, it is to be noted that the frame member 1110 can include all of the features of the frame member 1110 discussed above and below.

Additionally, FIG. 15A illustrates additional struts 1150 connecting the frame members 1110 and 1110'. Further, in FIG. 15A, a drive motor M is illustrated on the opposite side of that illustrated in FIG. 15. The drive motor M is configured to drive the front and rear rollers 24b, 26b and can be mounted on either side of the roller component 14b. Additionally, other drive systems can be used to drive the front and rear rollers 24b, 26b.

With continued reference to FIG. 14, the stripper wire support section 1122 can be in the form of a slot 1140 disposed at a position generally beneath the front roller 24b. The slot 1140 can include an enlarged end 1142 and an elongated narrower slot portion 1144 extending toward the conveyor 48b. The enlarged section 1142 can have a shape that is generally the same as the shape of such support sections that are well known in the art. This enlarged section 1142 provides clearance for a mechanic or worker to reach through the slot 1140 in an effort to thread a stripper wire, such as the stripper wire 44 illustrated in FIGS. 10-13. With the stripper wire support section 1122 oriented such that the enlarged portion 1142 is rearward from the elongated narrower slot section 1144, a worker can more easily attach a new stripper wire from the rear side of the front roller 24b.

For example, in some embodiments of this operation, the pivot arm 1130 can be lowered to the position illustrated in solid line in FIG. 14. Then, the worker can thread a new stripper wire through the enlarged portion 1142, along the outer surface of the front roller 24b, and under any bands 1102 that may be installed on the front roller 24b. The worker can similarly extend the stripper wire through a corresponding stripper wire support section (not shown) on the frame member 1110' (FIG. 14a).

With the worker or mechanic positioned as such, the conveyor 48b is not damaged. Further, the mechanic or worker can stand in a more comfortable position while performing this operation. Thus, the procedure for replacing a stripper wire such as the stripper wire 44, can be performed more easily and can result in less damage to components such as the conveyor 48b.

Similarly, with the worker positioned in the same or similar position, bands 1102 on the front roller 24b can also be more easily replaced. More specifically, the worker can stand on the rear side of the roller 24b while replacing the bands 1102.

During this procedure, the worker must wrap the bands 1102 around the stripper wire 44. Optionally, the worker can move the stripper wire 44 toward the enlarged portion 142 of the stripper wire support section 1122. With the stripper wire 44 in this position, the worker can wrap the band around the front roller 24b and around the stripper wire 44, and secure the band 1102 in place.

As noted above, the illustrated configuration of the frame member 1110 is merely one nonlimiting embodiment. In this illustrated embodiment, because the angle θ2 is less than about 90 degrees, the frame member 1110 supports the rear roller 26b in a cantilever configuration. In other embodiments, where the angle θ2 is about 90 degrees, the frame member 1110 supports the rollers 24b, 26b in a more columnar configuration.

It is also to be noted that the tension in the stripper wire 44 can be maintained in a number of different ways. The commonly used method is to use a pressurized air cylinder to maintain a relatively constant tension in the stripper wire 44 during operation.

It is also to be noted that the roller component 14b can be used with all of the other features noted above with reference to FIGS. 1-9.

Although these inventions have been disclosed in the context of certain preferred embodiments and examples, it will be understood by those skilled in the art that the present inventions extend beyond the specifically disclosed embodiments to other alternative embodiments and/or uses of the inventions and obvious modifications and equivalents thereof. In addition, while several variations of the inventions have been shown and described in detail, other modifications, which are within the scope of these inventions, will be readily apparent to those of skill in the art based upon this disclosure. It is also contemplated that various combination or sub-combinations of the specific features and aspects of the embodiments may be made and still fall within the scope of the inventions. It should be understood that various features and aspects of the disclosed embodiments can be combined with or substituted for one another in order to form varying modes of the disclosed inventions. Thus, it is intended that the scope of at least some of the present inventions herein disclosed should not be limited by the particular disclosed embodiments described above.

What is claimed is:

1. A comestible product sheeter comprising:
   a base portion encompassing a base area along a ground surface;
   at least one frame member including:
      a first roller mounting section with at least a first open ended slot supporting a first roller to rotate about a first axis; and
      a second roller mounting section with at least a second open ended slot supporting a second roller to rotate about a second axis;
   the first and second rollers being spaced from each other sufficiently to press a comestible product into a sheet configuration;
   wherein the at least one frame member is configured to maintain the first axis at a higher vertical location than an outermost surface of the second roller;
   wherein the first roller mounting section extends generally upwardly and outwardly from the base portion;
   wherein the first open ended slot of the first roller mounting section extends generally away from the second roller at an angle greater than about 15 degrees relative to horizontal;
   wherein at least a portion of the first open ended slot extends beyond the base area along a ground surface in order to facilitate access to the first roller; and
   wherein the area beneath the at least a portion of the first open ended slot that extends beyond the base area is generally open and accessible.

2. The comestible product sheeter of claim 1, further comprising at least one cutting roller support section.

3. The comestible product sheeter of claim 2, wherein the cutting roller support section comprises a cutting roller and a pivot arm supporting the cutting roller and pivotably connected to the frame member so as to allow the cutting roller to be pivoted toward and away from at least one of the first and second rollers.

4. The comestible product sheeter of claim 3, wherein the pivot arm comprises an open-ended slot configured to receive a shaft of the cutting roller.

5. The comestible product sheeter of claim 3 additionally comprising at least one stop configured to define a lowermost position of the pivot arm.

6. The comestible product sheeter of claim 5, wherein the at least one stop is positioned such that when the pivot arm is positioned in its lowermost position against the stop, the cutting roller can be lifted upwardly out of engagement with the pivot arm.

7. The comestible product sheeter of claim 1, further comprising at least one drive motor configured to drive at least one of the first roller and the second roller.

8. The comestible product sheeter of claim 1 wherein the frame member supports the first roller such that a line extending between the first and second axes is inclined at least 15 degrees from horizontal.

9. The comestible product sheeter of claim 1, wherein the frame member is configured to support the first roller in a cantilever configuration.

10. The comestible product sheeter of claim 1, additionally comprising a conveyor roller support disposed below the second roller.

11. A comestible product sheeter comprising:
    a base portion;
    at least one frame member including:
       a first roller mounting section configured to support at least a first roller; and
       a second roller mounting section configured to support at least a second roller;
    a first roller supported by the first roller mounting section; and
    a second roller supported by the second roller mounting section in an orientation substantially parallel to the first roller and spaced from the first roller such that the first and second rollers can press a comestible product into a sheet configuration;
    wherein the at least one frame member is configured such that a line extending between the axes of rotation of said first and second rollers is greater than approximately 15 degrees relative to horizontal;
    wherein the first roller mounting section extends upwardly and outwardly from the base portion and comprises a first open ended slot for receiving the first roller;
    wherein the second roller mounting section comprises a second open ended slot for receiving the second roller;
    wherein the first open ended slot is generally transverse to the second open ended slot.

12. The comestible product sheeter of claim 11, further comprising at least one cutting roller support section.

13. The comestible product sheeter of claim 12, wherein the cutting roller support section comprises at least one cutting roller support arm pivotally mounted to the at least one frame member.

14. The comestible product sheeter of claim 13, wherein a cutting roller support arm is configured to allow the cutting roller to be pivoted toward and away from at least one of the first and second rollers.

15. The comestible product sheeter of claim 14, wherein the cutting roller support arm is configured such that when pivoted away from at least one of the first and second rollers, the cutting roller can be lifted upwardly out of engagement with the cutting roller support arm.

16. The comestible product sheeter of claim 14 additionally comprising at least one stop configured to define a lowermost orientation of the cutting roller support arm.

17. The comestible product sheeter of claim 14, wherein the cutting roller support arm is configured such that when the cutting roller support arm is in a lowermost position, the cutting roller can be lifted upwardly out of engagement with the cutting roller support arm.

* * * * *